R. HALL, Jr.
SELF FEEDING STAY BOLT CUTTER.
APPLICATION FILED DEC. 26, 1912.
1,077,196.
Patented Oct. 28, 1913.
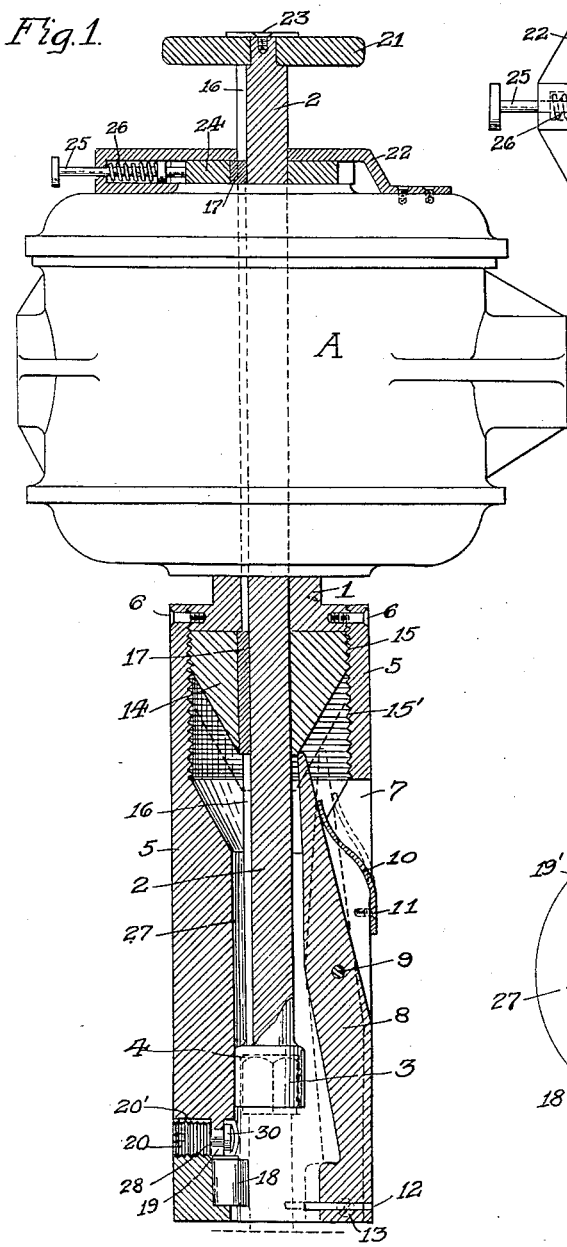
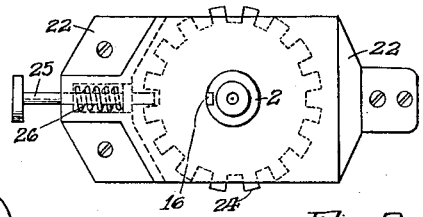
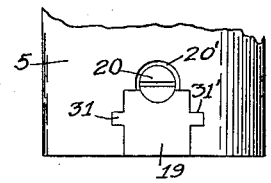
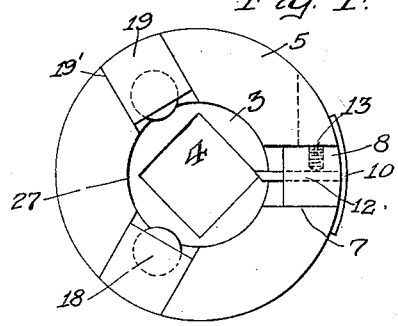
WITNESSES
H. W. Silloway
Sarah Schwartz
ROBERT HALL, Jr.
INVENTOR
BY Fred. D. Silloway
ATTORNEY

UNITED STATES PATENT OFFICE.

ROBERT HALL, JR., OF SPRINGFIELD, ILLINOIS.

SELF-FEEDING STAY-BOLT CUTTER.

1,077,196.

Specification of Letters Patent.

Patented Oct. 28, 1913.

Application filed December 26, 1912. Serial No. 738,608.

*To all whom it may concern:*

Be it known that I, ROBERT HALL, Jr., a citizen of the United States, residing at Springfield, in the county of Sangamon and State of Illinois, have invented new and useful Improvements in Self-Feeding Stay-Bolt Cutters, of which the following is a specification.

My invention relates to improvements in self-feeding stay-bolt cutters of a type adapted to be driven by an air motor, or the like.

The object of my invention is to provide a device of the class described which will be simple in construction and so arranged that it may be readily, quickly and easily placed over a stay-bolt and operated to cut off the bolt at any desired distance from the end.

My invention consists in certain details, in the construction, arrangement and combination of the various parts of the device, whereby the above objects contemplated are attained, as hereinafter more fully set forth, pointed out in the claims, and illustrated in the accompanying drawings, in which:

Figure 1 is a longitudinal sectional view of the device of my invention, shown in connection with an air motor adapted to drive the same. Fig. 2 is a plan view of the housing about the shaft adjusting device, carried on the upper side of an air motor, the shaft handle being removed. Fig. 3 is a detail view of the adjusting block. Fig. 4 is a view of the under side of the bolt cutter.

Referring to the accompanying drawings, I have used the reference letter "A" to indicate the air motor by which, in the preferred embodiment of my invention, the device is driven.

1 designates a revolving chuck, driven by the air motor, through which passes a non-revolving slidable shaft 2. On the lower end of shaft 2 is an enlarged cylindrical head 3, having a square socket 4 therein.

5 designates a tubular casing having its upper portion threaded on to chuck 1, and being further secured thereto by screws 6. Head 3 of shaft 2 is adapted to slide up and down in casing 5, head 3 being slidably fitted in guide cylinder 27. Slot 7 is provided in casing 5, in which cutter holder 8 is adapted to move, cutter holder 8 being held therein by fulcrum pin 9. Spring 10 is attached on each side of slot 7, and extends into said slot and engages the upper end of cutter holder 8, being adapted to press cutter holder 8 inward at this point.

11 indicates screws by which spring 10 is attached to casing 5.

12 designates a cutter blade fitted into an opening in the lower end of cutter holder 8, being held in place therein by set screw 13.

14 designates a feed-cone which is slidably mounted upon shaft 2, having a key 17 mounted therein adapted to slide in key-way 16 of shaft 2. Threads 15 on feed-cone 14 are adapted to mesh with threads 15' on the inner side of casing 5.

In order to provide adjustment so that the device of my invention may be used on several size bolts, adjusting blocks 19, adapted to slide in slots 19', are provided. Adjusting blocks 19 are provided with roller bearings 18 which extend inward beyond the inner faces of the adjusting blocks.

20 indicates an adjusting screw fitted into hole 20', having a pin 28 adapted to fit in slotted hole 29 in casing 5. Head 30 is provided on the inner end of pin 28. Hole 20' is not provided with threads to engage with adjusting screw 20, but threads are provided in block 19. It will be readily seen that block 19 will be easily drawn back and forth by the rotation of adjusting screw 20, head 30 preventing the backward or forward movement of the adjusting screw. Block 19 is provided with keys 31 adapting said block to slide back and forth in key-ways 31 and 31'. In order to adjust the position of slot 4 in head 3 of shaft 2, a shaft adjusting device is provided.

21 indicates a handle attached to the upper end of shaft 2 by screw 23. The length of shaft 2 is such that it will protrude through the air motor when head 3 is in its lowest practical position, making it advantageous to provide the shaft adjusting device on the upper side of the air motor. A gear wheel 24 is slidably mounted about shaft 2, having a key 17 mounted therein and adapted to slide in key-way 16 of the shaft. A housing 22 fits over gear wheel 24 and holds the same in place against the upper side of air motor A. A pin 25 is provided which slides in housing 22 and is adapted to engage with the teeth on gear wheel 24. Coil spring 26 is adapted to force pin 25 inward. When it is desired to revolve shaft 16, pin 25 is drawn outward releasing the teeth on gear 24 and allowing the shaft to be adjusted as desired.

In bringing the device of my invention into operation casing 5 is fitted about the stay-bolt, and shaft 2 is fed down through cylindrical opening 27 until the head of the bolt is loosely fitted into socket 4. Adjusting blocks 19 are then adjusted to suit the size of the stay-bolt and the air motor is thrown into revolution. It will be readily seen that when chuck 1 in connection with the air motor begins to revolve, feed-cone 14 will be fed downward by threads 15' on the inner side of casing 5. As feed-cone 14 moves downward the upper end of cutter holder 8 will be moved outward, the cutter holder being revolved about fulcrum pin 9. This movement of cutter holder 8 will throw cutter 12 inward, cutter 12 cutting into the stay-bolt by reason of the revolution of the entire device about shaft 2. When the stay-bolt is cut sufficiently, the air motor is reversed and feed-cone 14 is drawn upward to its normal position and cutter 12 is likewise drawn back by the action of spring 10. It will be understood that it is only necessary to cut a groove about a stay-bolt, in the process of cutting the same in two, and a hammer blow is then necessary to break off the bolt at the groove made by the cutter.

From the foregoing description it will be seen that the device of my invention provides a self-feeding stay-bolt cutter which will be simple in construction and speedy and effective in its operation.

I wish it to be understood that changes within the spirit and scope of the appended claims may be made, as it is obvious that the arrangement of parts and details of construction may be varied in many ways.

Having thus described my invention, what I claim is:—

1. The combination with an air motor, or similar actuating appliance, of a shaft member having a longitudinally extending key-way therein, said shaft having an enlarged head on the lower end thereof provided with a socket, a casing member, a feed-cone member, a cutter holder member, a cutter member, adjusting blocks, adjusting screws, a cutter holder spring, and a shaft adjusting device.

2. The combination with an air motor, or similar actuating appliance, of a shaft member, a casing member attached to the chuck of the air motor, said casing being provided with a longitudinally extending slot through its wall for the reception of a cutter, said casing carrying threads on its inner wall adapted to mesh with threads carried on a feed-cone, a feed-cone member, a cutter holder member, a cutter member, adjusting blocks, adjusting screws, a cutter holder spring, and a shaft adjusting device.

3. The combination with an air motor, or similar actuating appliance, of a shaft member, a casing member provided with a guide cylinder, said casing member being provided with adjusting blocks and adjusting means for said adjusting blocks, a feed-cone member, a cutter holder member, and a shaft adjusting device.

4. The combination with an air motor, or similar actuating appliance, of a shaft member, a casing member, a feed-cone member slidably mounted upon a shaft member and provided with a key adapted to slide in a key-way carried by a shaft member, a cutter holder, a cutter member, adjusting blocks, and a shaft adjusting device, substantially as described.

5. The combination with an air motor, or similar actuating appliance, of a shaft member, a casing member, a feed-cone member slidably mounted upon a shaft member, said feed-cone provided with threads adapted to mesh with threads carried by a casing member, a cutter holder member, a cutter member, adjusting blocks, adjusting screws, a cutter holder spring, and a shaft adjusting device.

6. The combination with an air motor, or similar actuating appliance, of a shaft member, a casing member, a feed-cone member, a cutter holder carried in a slot in a casing member and having an actuating portion adapted to contact with a feed-cone, said cutter holder being mounted in a slot in a casing member on a fulcrum pin carried by said casing member, a cutter holder spring, a cutter member, adjusting blocks, adjusting screws and a shaft adjusting device.

7. The combination with an air motor, or similar actuating appliance, of a shaft member, a casing member, a feed-cone member, a cutter holder member, a cutter member carried by a cutter holder, adjusting blocks, adjusting screws, a cutter holder spring, and a shaft adjusting device.

8. The combination with an air motor, or similar actuating appliance, of a shaft member, a casing member, a feed-cone member, a cutter holder member, a cutter member, adjusting blocks carrying roller members and slidably mounted in a casing member, adjusting screws, a cutter holder spring, and a shaft adjusting device.

9. The combination with an air motor, or similar actuating appliance, of a shaft member, a casing member, a feed-cone member, a cutter holder member, a cutter member, adjusting blocks, adjusting screws carried by a casing member and adapted to mesh with threads carried by adjusting blocks, said adjusting screws having necked portions adapted to fit in slotted openings in a casing, a cutter holder spring, and a shaft adjusting device.

10. The combination with an air motor, or similar actuating appliance, of a shaft member, a casing member, a feed-cone member, a cutter holder member, a cutter member, adjusting blocks, adjusting screws, a cutter holder spring carried by a casing member and adapted to force the actuating end of a cutter holder against a feed-cone member, and a shaft adjusting device, substantially as described.

11. The combination with an air motor, or similar actuating appliance, of a shaft member, a casing member, a feed-cone member, a cutter holder member, a cutter member, adjusting blocks, adjusting screws, a cutter holder spring, a shaft adjusting device comprising a housing, a gear wheel slidably keyed to and at right angles to a shaft, and a pin and spring adapted to allow the manual rotation of said shaft and gear wheel, substantially as described.

ROBERT HALL, Jr.

Witnesses:
H. W. SILLOWAY,
SARAH SCHWARTZ.

Copies of this patent may be obtained for five cents each, by addressing the "Commissioner of Patents, Washington, D. C."